(12) United States Patent
Davis

(10) Patent No.: US 6,696,009 B2
(45) Date of Patent: Feb. 24, 2004

(54) METHOD FOR CONTROLLING THICKNESS DURING LAY-UP AND FABRICATION OF COMPOSITE COMPONENTS

(75) Inventor: Geoffrey C. R. Davis, Madison, CT (US)

(73) Assignee: Sikorsky Aircraft Corporation, Stanford, CT (US)

( * ) Notice: Subject to any disclaimer, the term of this patent is extended or adjusted under 35 U.S.C. 154(b) by 420 days.

(21) Appl. No.: 09/814,017

(22) Filed: Mar. 21, 2001

(65) Prior Publication Data

US 2002/0135093 A1 Sep. 26, 2002

(51) Int. Cl.[7] .................. B29C 70/44; B29C 43/10; B29C 43/12
(52) U.S. Cl. .................. 264/510; 264/257; 264/258; 264/313; 264/324; 264/511; 425/389
(58) Field of Search .................. 264/510, 511, 264/512, 257, 258, 313, 314, 324; 425/389

(56) References Cited

U.S. PATENT DOCUMENTS

| | | | |
|---|---|---|---|
| 5,759,325 A | 6/1998 | Davis | |
| 5,876,546 A * | 3/1999 | Cloud | 156/212 |
| 6,287,080 B1 * | 9/2001 | Evans et al. | 416/229 A |
| 6,290,895 B1 * | 9/2001 | Wang et al. | 264/510 |
| 6,350,115 B1 * | 2/2002 | Sloman | 425/389 |
| 6,406,660 B1 * | 6/2002 | Spurgeon | 264/510 |
| 6,533,986 B1 * | 3/2003 | Fosaaen et al. | 264/314 |

* cited by examiner

*Primary Examiner*—Stefan Staicovici
(74) *Attorney, Agent, or Firm*—Carlson, Gaskey & Olds (57) ABSTRACT

A method for producing a composite component having a variable thickness includes placing a caul member over a plurality of laid-up prepreg plies supported by a mold. The mold includes a cavity for receiving the lay-up that is defined by a bottom surface, a plurality of walls extending upwardly from the bottom surface, and an open upper face surrounded by a mold edge. A support flange extends inwardly toward the center of the cavity from each of the walls at a predetermined distance from the bottom surface. The caul is made from an anisotropic material so that the caul is basically rigid about lateral axis and flexible about a longitudinal axis. During an autoclave curing process, the caul applies pressure along the length of the lay-up to draw the caul into engagement with the support flange, which serves as a stop to prevent further movement of the caul.

21 Claims, 6 Drawing Sheets

METHOD FOR CONTROLLING THICKNESS DURING LAY-UP AND FABRICATION OF COMPOSITE COMPONENTS

This invention was made with government support under Contract No.: DAAJ09-91-C-A004 awarded by the Department of the Army. The government therefore has certain rights in this invention.

BACKGROUND OF THE INVENTION

The present invention provides a method and apparatus for controlling the thickness of an autoclave cured composite component. Specifically, a mold with a cavity having a stop formed about the perimeter of the cavity receives a lay-up, a caul member is placed over the lay-up, and the lay-up is cured causing the caul to move into engagement with the stop. Thus, uniform pressure is applied along the length of the lay-up during the cure cycle resulting in a composite component with precisely controlled thicknesses.

Composite materials are often used in the aerospace industry because of their high strength-to-weight ratio. Aerospace components made from composites must be fabricated such that precise tolerances are maintained. Components that are out of tolerance may adversely affect important characteristics such as structural integrity, performance, fatigue life, etc. Tolerance control is especially important in the manufacture of helicopter flexbeams, for example.

One important dimensional criteria for a flexbeam is the thickness. The thickness varies along the length of the flexbeam. The variation range can be as great as 0.3 inches to 2.5 inches. The flexbeams are typically made from pre-impregnated (prepreg) composite materials of variable per ply thickness. Prepregs are formed from a plurality of fiber members that are saturated with a resinous material. Prepregs are stacked together in various orientations to form laminates.

The fabrication of thick complex prepreg composite components with significant variations in thickness is difficult when using current process technology. Problems such as inconsistent laminate quality and large dimensional variations often occur. This results in increased scrap and reworking of components.

One current composite fabrication method produces autoclave cured components that have good laminate quality but have poor dimensional control. Another fabrication method produces press cured components that have good dimensional control but poor laminate quality. One of the significant factors that causes these difficulties is the variability in the yield or per ply thickness of the prepreg composite materials.

In the past, the preferred method for producing aerospace components has been press-curing where matched metal molds are used. In this process, the prepregs are laid-up in the mold and then press cured according to a specified cure cycle. As discussed above, press curing produces components with suitable dimensional accuracy but with inconsistent laminate quality. An improvement on this process is disclosed in U.S. Pat. No. 5,759,325 (Method For Controlling Thickness During Lay-Up And Fabrication Of Press-Cured Composite Articles), however, even this process produces undesirable variations in complex components. Processing problems are caused because the press mold during cure does not make uniform contact with the lay-up as the mold closes. Initially, only the thickest parts of the lay-up make contact with the moving part of the mold and only these areas receive any process pressure. This is caused by the bulk in the lay-up. Bulk refers to the trapped air that bleeds out of the lay-up or which is compressed as the resin softens during cure. As the cure progresses, more of the surface area comes in contact with the moving section of the mold and the pressure is slowly transferred to the entire length of the lay-up. This variation and movement of pressure in the lay-up during cure is the main problem of press curing. In contrast, autoclave curing can provide uniform pressure to the entire length of the lay-up even with bulk. However, as discussed above, the problem with autoclave curing is dimensional accuracy and repeatability.

Accordingly, it is desirable to have a process that has the benefit of good laminate properties produced by autoclave curing yet also includes the benefit of dimensional accuracy and repeatability produced by press curing.

SUMMARY OF THE INVENTION

One of the objects of the present invention is to provide a method and apparatus for precisely controlling the thickness of a composite component in an autoclave environment.

In the preferred embodiment, a fabrication apparatus for producing a composite component having a variable thickness includes a female mold defining a cavity for receiving a lay-up comprised of a plurality of prepreg plies. The mold has a support flange extending into the cavity. A caul is positioned over the lay-up and defines a first axis and a second axis. The caul is made from an anisotropic material having greater flexibility along the one of the axes than the other. Preferably the first axis is a longitudinal axis and the second axis is a lateral axis and the caul is more flexible along the longitudinal axis than the lateral axis such that as the component is cured the caul is drawn into engagement with the support flange. The component is cured in an autoclave that applies a predetermined cure cycle to the component. Preferably, the caul is rigid along the lateral axis and flexible about the longitudinal axis to transmit uniform pressure along the length of the lay-up as the caul is drawn into engagement with the support flange.

Also in the preferred embodiment, the anisotropic material is comprised of a fiber reinforced composite including at least two different laminates. Preferably, a plurality of fiberglass laminates are sandwiched between a plurality of graphite laminates wherein the fiberglass laminates are +/−45 degree laminates and the graphite laminates are 90 degree unidirectional laminates.

In one embodiment, the cavity is defined by a bottom surface, a plurality of walls extending upwardly from the bottom surface, and an open upper face surrounded by a mold edge. The support flange extends into the cavity from each of the walls at a predetermined distance upward from the bottom surface. The predetermined distance varies along the length of the mold such that the support flange conforms to a thickness profile of the composite component to be fabricated.

The method for controlling thickness during fabrication of an autoclave cured component includes the following steps: laying up a plurality of prepreg plies into a female mold defining a cavity including a stop, installing a caul over the lay-up, and curing the lay-up in an autoclave causing the caul to be restrained by the stop. Additional steps include inserting a plurality of deformable members between the cavity walls and lay-up prior placing the caul over the lay-up to apply a back pressure during the cure cycle.

The preferred method includes the steps of vacuum bagging the mold, lay-up, and caul and checking for leaks and heating the mold and the lay-up to a dwell temperature and pressure until the caul is restrained against the stop. Then the temperature and pressure are increased and held for a predetermined amount of time to cure the component.

This unique apparatus provides a method for controlling component thickness during autoclave curing for complex composite components having a large variation in thickness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

The method and apparatus for controlling the thickness during lay-up and fabrication of composite components is described below. The apparatus includes a unique mold 10 and caul 12, shown in FIG. 1, that is used to control thickness during autoclave curing that is especially effective for the fabrication of complex composite components with a large variation in thickness.

Figures 1, 2:
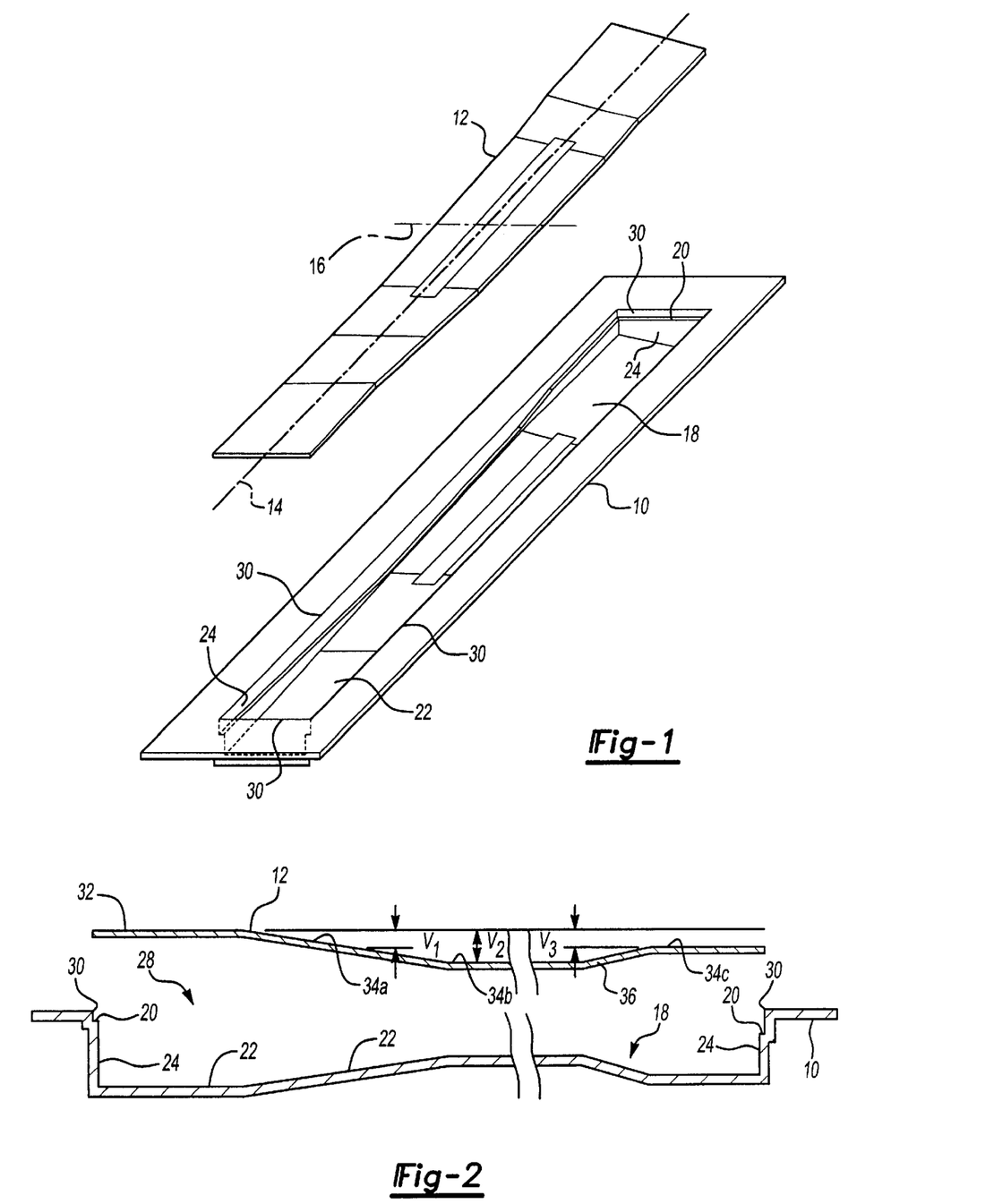
FIG. 1 is an empty mold cavity incorporating the unique caul and support flange interface.
FIG. 2 is a longitudinal cross-sectional view of the caul and mold of FIG. 1.

The unique caul 12 provides support against autoclave pressure in the directions required to assure component thickness control yet at the same time the caul 12 is capable of transferring autoclave pressure to move the laminate in the direction of its non-critical dimensions. The caul 12 defines a longitudinal axis 14 that extends along the length of the caul 12 and a lateral axis 16 that extends along the width of the caul 12. The longitudinal 14 and lateral 16 axes are perpendicular to each other. In order to effectively control component thickness, the caul 12 is essentially rigid in one direction while being flexible in another. The caul 12 utilizes anisotropic properties of composite construction to achieve the required stiffness variations.

When a flexbeam component is formed for a helicopter, the caul 12 is preferably rigid along the lateral axis 16 and flexible along the longitudinal axis 14. However, it should be understood that the reverse orientation could also be used for the formation of other components. Regardless of the orientation of the flexible and rigid axes, composite components fabricated with this process should contain a high proportion of unidirectional material in the areas where thickness control is required. This is desirable, so that the composite material is capable of moving during cure. A unidirectional material is formed from a plurality of parallel fibers that are to be saturated in a resinous material. These saturated fibers form a pre-impregnated (prepreg) material. Prepregs are stacked together in various orientations to form laminates.

To form the composite components, a plurality of prepregs are laid-up in the mold. The prepregs are then vacuumed bagged and autoclave cured. This process will be discussed in greater detail below. The caul 12 works with the mold 10 to achieve the advantages of autoclave curing (uniform cure process pressure and temperature application resulting in high quality laminate) in combination with the cured component dimensional accuracy of matched tooling as used in press curing.

As discussed above, one of the problems with press curing is that initially only the thickest parts of the lay-up make contact with the moving part of the mold and only these areas receive any process pressure. This is caused by the bulk in the lay-up. Bulk refers to the trapped air that bleeds out of the lay-up or which is compressed as the resin softens during cure. The caul 12 of the subject invention will initially transmit the autoclave pressure uniformly to all of the bulked-up oversize composite lay-up because the caul 12 deflects in the required direction. This uniform pressure transmission will continue throughout the cure until the movement of the caul 12 is limited by the mold 10. In this final position the caul 12 assumes the desired configuration for the top of the component being cured. The caul 12 will attain this configuration because of the rigidity in the direction transverse to the flexing direction. This rigidity reacts directly against the mold 10. Once the caul 12 is in this final position, the back pressure on the composite laminate is maintained by deformable material placed between the lay-up and the mold 10.

This compressible back pressure media is used to compensate for normal lay-up volume variations. This will be discussed generally below but is discussed in detail in U.S. Pat. No. 5,759,325 (Method For Controlling Thickness During Lay-Up And Fabrication Of Press-Cured Composite Articles) assigned to the assignee of this application and herein incorporated by reference.

As shown in FIG. 1, the mold 10 includes a female mold cavity 18 with a support flange 20 that extends inwardly toward the center of the cavity 18. The cavity 18 is defined by a bottom surface 22, a plurality of walls 24 extending upwardly from the bottom surface 22, and an open upper face 28 (shown in FIG. 2) surrounded by a mold edge 30.

The support flange 20 extends into the cavity 18 from at least one of the walls 24 at a predetermined distance downward from the mold edge 30 or upward from the bottom surface 22. Preferably, the support flange 20 is perpendicular to the walls 24 and extends outwardly from each of the walls 24.

When the mold 10 is used to form a complex component such as a flexbeam, for example, the predetermined distance varies along the mold edge 30. Thus, parts of variable thickness can be easily formed. As shown in FIG. 2, the caul 12 used to form a flexbeam is a multi-planar component having a base plane 32 and a plurality of sub-planes 34a,b,c . . . positioned at pre-selected vertical distances V1, 2, 3 . . . from the base plane 32. A caul edge 36 interconnects the base plane 32 to the sub-planes 34a, b, c . . . The profile of the caul edge 36 conforms to the profile of the support flange 20 to form the desired shape of the component.

Figure 3:
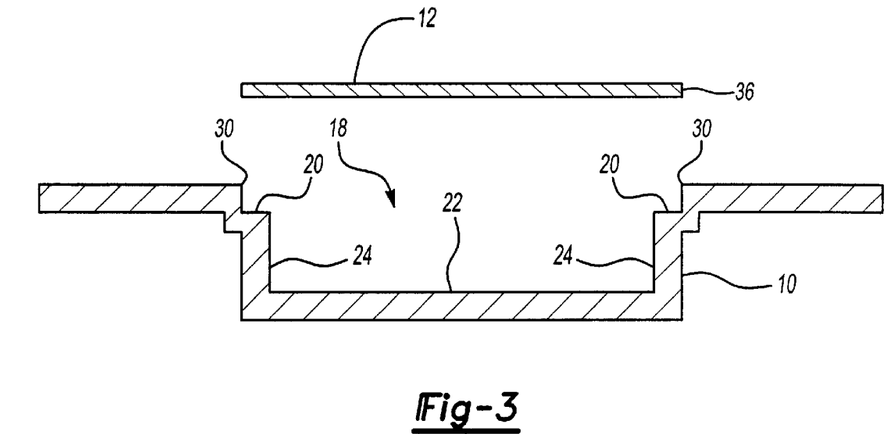
FIG. 3 is similar to FIG. 2 but is taken along the width of the caul and mold.

The mold 10 is configured with the recessed flange 20 to support and restrain the caul 12 when all laminate motion has ceased during the cure process. A cross-sectional view of the mold 10 showing the relationship between the caul 12 and flange 20 is shown in FIG. 3. The flange/caul interface is the mechanism that enables the tooling and process to fabricate components with consistent dimensional accuracy.

Figure 4:
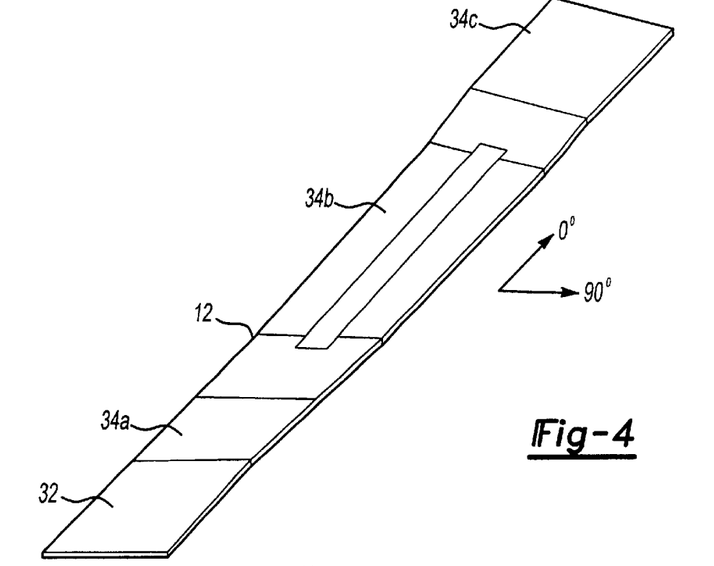
FIG. 4 is a perspective view of the caul shown in FIG. 1.

The caul 12, as shown in FIG. 4, is preferably formed from an anisotropic material such as a fiber-reinforced composite. The mold surface of the caul 12 mirrors the respective component surface and can be made from any composite material known in the art. Fiberglass, graphite, carbon or other known fibers can be saturated with a resinous material such as epoxy, for example.

Figure 5:
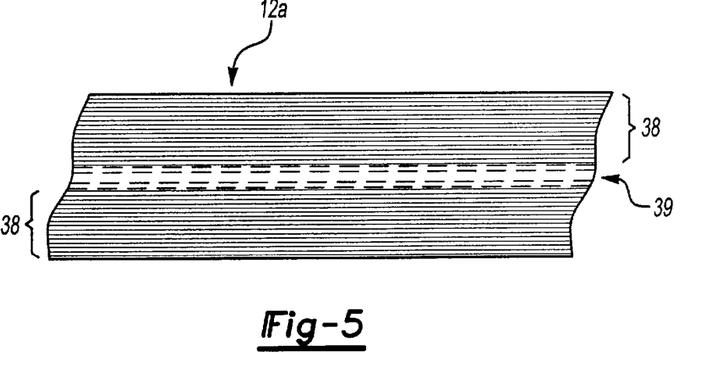
FIG. 5 is a cross-sectional view of one embodiment of the caul.
Figure 6:
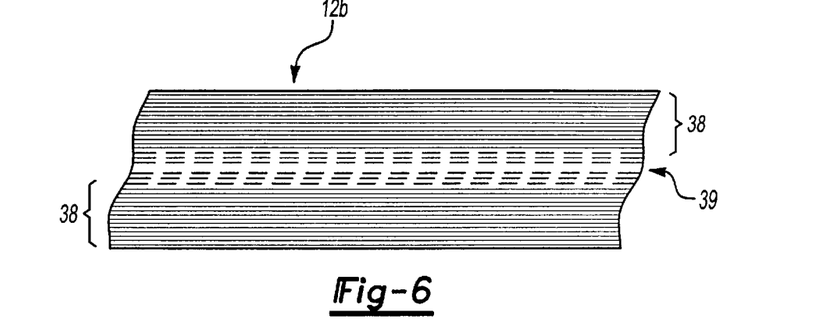
FIG. 6 is a cross-sectional view of an alternate embodiment of the caul.

As shown in FIGS. 5 and 6, the caul 12 is formed from a composite material with a ply lay-up configuration. Preferably, graphite laminates 38 are used on the outside surfaces for stiffness and fiberglass laminates 39 are used on the inside for flexibility. The caul 12 can be formed with different thicknesses. A 0.25 inch thick caul 12a is shown in FIG. 5 and a 0.38 inch thick caul 12b is shown in FIG. 6.

In the preferred embodiment, the 0.25 inch thick caul 12a has eighteen (18) graphite laminate plies 38 on the top and eighteen (18) graphite laminate plies 38 on the bottom. Four (4) fiberglass laminate plies 39 are sandwiched between the graphite laminates 38. Preferably, the graphite laminates 38 are 90° unidirectional laminates and the fiberglass laminates 39 are +/−45° laminates. This lay-up is relatively well balanced for thermal stress, provides sufficient torsional stiffness, has high transverse stiffness, and has relatively high axial flexibility.

In the preferred embodiment, the 0.38 inch thick caul 12b has twenty-seven (27) graphite laminate plies 38 on the top and twenty-seven (27) graphite laminate plies 38 on the bottom. Six (6) fiberglass laminate plies 39 are sandwiched between the graphite laminates 38. Preferably, the graphite laminates 38 are 90° unidirectional laminates and the fiberglass laminates 39 are +/−45° laminates.

Cauls having different thickness are required to control bowing during cure. Initially, the thinner caul 12a would be used, however, if too much bowing is exhibited, i.e. there is not uniform contact along the length of the component lay-up during cure, then the thicker caul 12b is used. One unique feature of these composite cauls 12 is the ability to readily flex in one direction yet remain very rigid in the other. This enables the caul 12 to transmit autoclave pressure uniformly to the component lay-up during cure while also providing dimensional accuracy of matched tooling.

The selected thickness and lay-up for the cauls 12a and 12b are chosen to suit the fabrication of a flexbeam component. The thickness and lay-up would change depending upon the configuration of the component to be fabricated.

Figure 7:
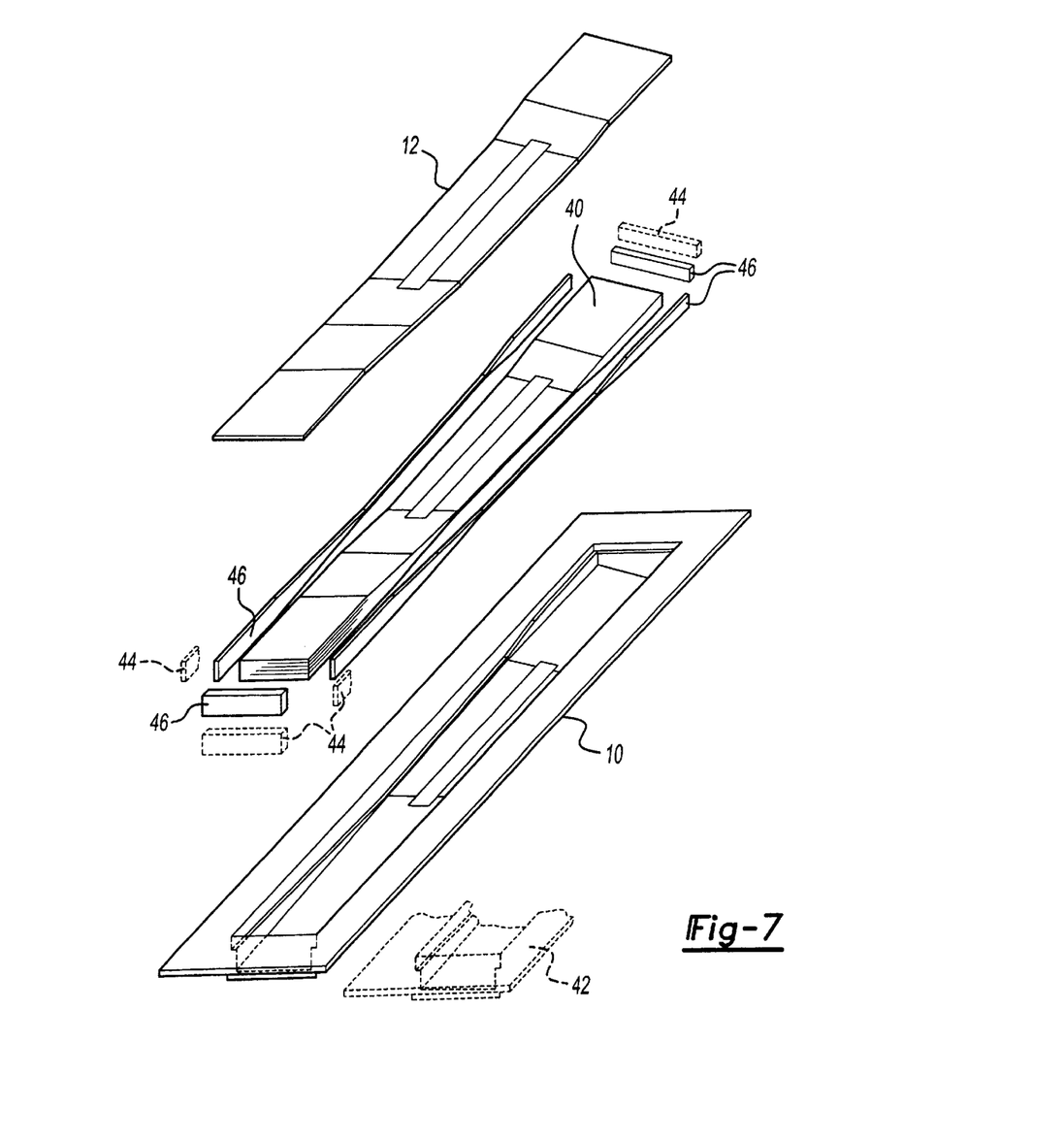
FIG. 7 is an exploded view of a caul, lay-up, and mold assembly incorporating the subject invention.

As shown in FIG. 7, component lay-up 40 can be laid directly into the autoclave mold 10. The lay-up and autoclave cure mold 10 is fabricated with additional cavity space to accommodate sacrificial foam type material described in U.S. Pat. No. 5,759,325. Optionally, the component lay-up 40 can be set up in a separate lay-up mold 42 and then transferred to the autoclave mold 10. Removable spacers or interchangeable rails 44 can be used to modify the mold cavity size/shape for the ply lay-up 40.

Preferably, the plies used for the lay-up 40, are cut slightly oversize to provide a machining allowance. For example, the plies for the lay-up for flexbeams are 0.25 inches wider on each side, i.e., the plies are 0.25 inches wider on each side from the widest point of the flexbeam. The plies should be of constant width to simplify lay-up and tooling. Preferably, a Gerber® automated ply cutter is used.

The plies are hand laid-up as is known in the art, however, an automated process for laying-up could also be used. Periodic cold vacuum compaction cycles combined with at least one autoclave compaction cycle are also performed.

In the preferred embodiment, the plies are laid-up in accordance with specific ply sequences. For example, initially plies would be laid-up with specified ply sequence sheets. Then a room temperature vacuum compaction of at least thirty (30) minutes is performed, after laying-up each sequence sheet. Then additional plies are laid-up. Next, the lay-up is vacuum bagged and autoclave compacted for at least one hour at 80° F. and 100 psi.

Lay-up thickness measurements are taken after the autoclave compaction cycle at the mid-point of the lay-up 40. Then the optional lay-up (ply packs) is selected. The thickness measurements are used to determine the number and type of alternate ply-packs to be incorporated. These ply-packs are used to compensate for the gross variation of the prepreg material. Measurements taken at this point can easily determine the build level of the component so that the cured volume variation remains below 5%, which is the level that can be compensated for by the cure control method. Next, the second half of the lay-up is performed in the same manner as the first half.

At completion of the lay-up, the mold 10 is reconfigured for autoclave cure by removing the lay-up rails 44. If the lay-up is performed in a lay-up mold 42 then the lay-up 40 is transferred to the cure mold 10. The spaces between the lay-up 40 and the walls 24 of the cavity 18 are filled with a plurality of sacrificial foam members 46. The preferred foam material is Rohacell®.

Figure 8:
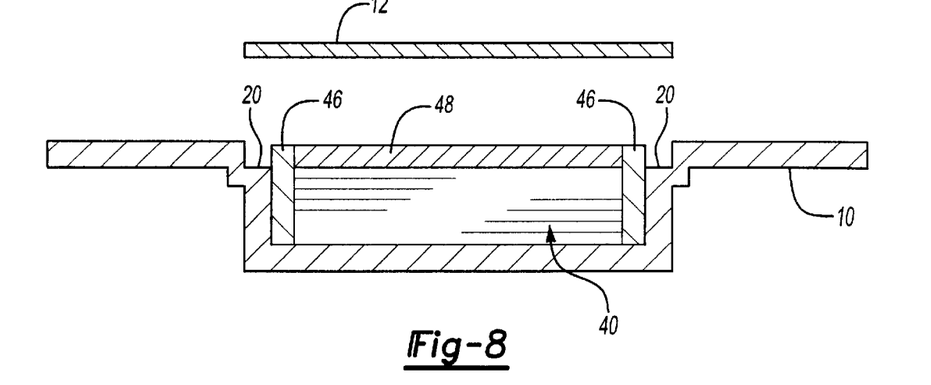
FIG. 8 is a cross-sectional view taken along the width of the mold and showing the lay-up and foam members installed within the mold.
Figure 9:
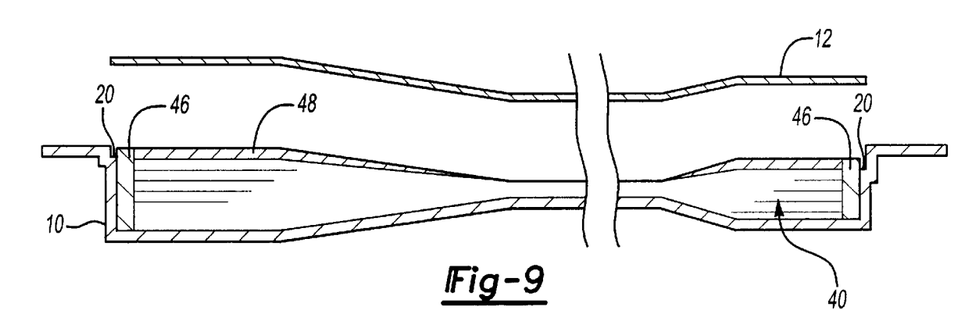
FIG. 9 is a view similar to FIG. 8 but taken longitudinally along the mold and caul.

Next, the caul 12 is placed over the lay-up 40. Lay-up bulk 48 is schematically shown on top of the lay-up 40, in FIGS. 8 and 9. As shown in FIG. 9, bulk 48 is proportionately thicker at the thicker parts of the lay-up 40.

Figure 10:
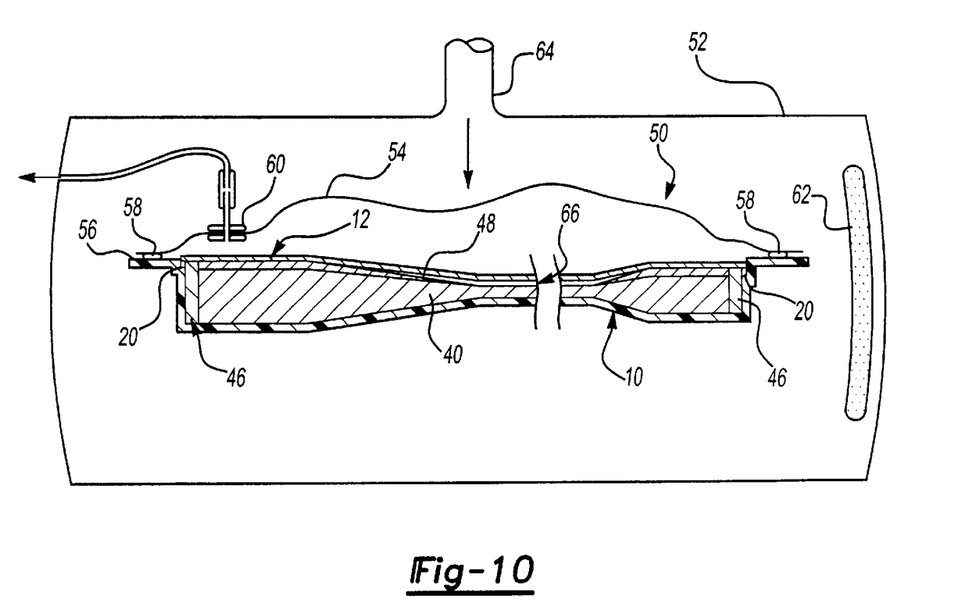
FIG. 10 is a schematic longitudinal cross-sectional view of a mold and caul that are vacuum bagged and inserted into an autoclave and which shows lay-up and foam members laid in the mold with the caul resting on top of the lay-up.
Figure 11:
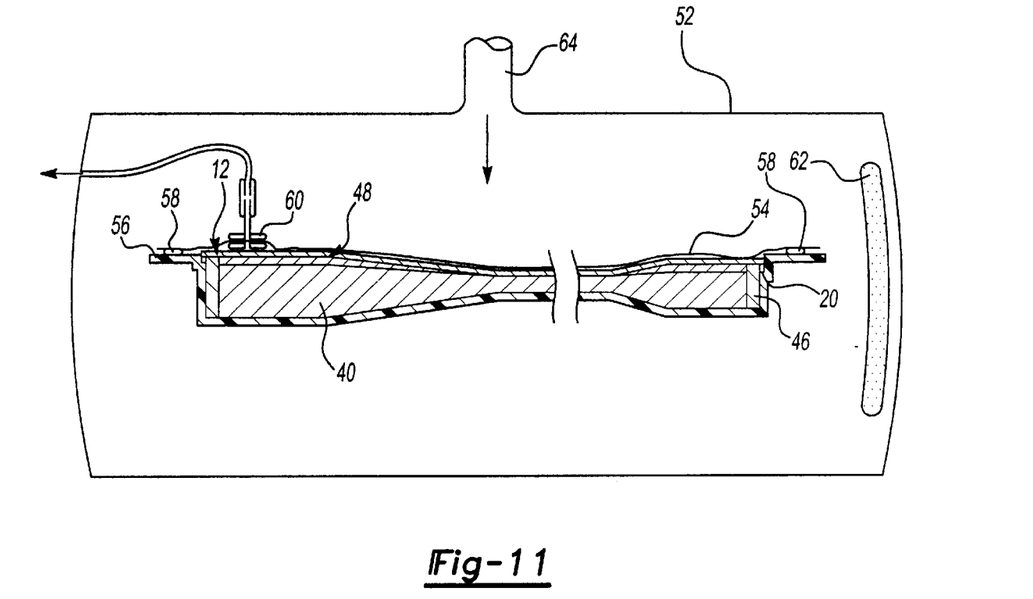
FIG. 11 is similar to FIG. 10 but shows the caul applying uniform pressure along the length of the lay-up due to the application of an autoclave cure cycle.
Figure 12:
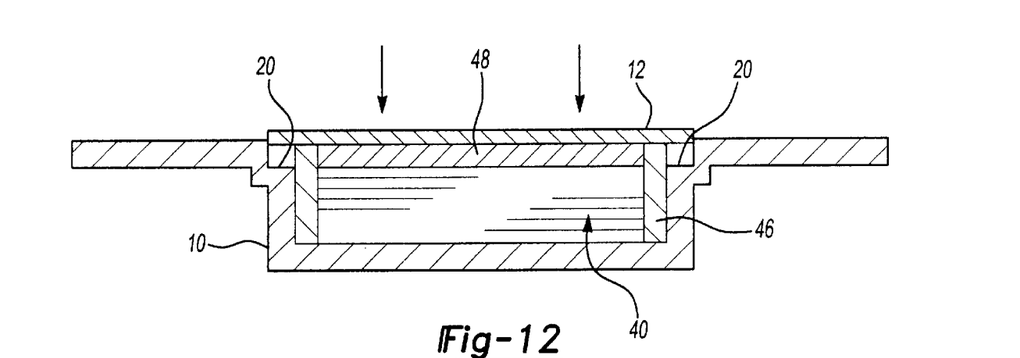
FIG. 12 is a cross-sectional view taken along the wide of the mold and caul, showing the initial contact between the caul and the lay-up during cure.

The mold 10, lay-up 40, and caul 12 are bagged in a vacuum bag assembly 50 with bleeders and breathers and leak checked for curing in an autoclave 52, see FIG. 10. The vacuum bag assembly 50 includes a vacuum bag 54 that is attached to a mold bagging flange 56. The bag 54 is held in place with a sealant material 58. Vacuum ports 60 are installed in the bag assembly 50. The air is pumped out by hoses leading to vacuum pump (not shown) until the bag is pulled against the caul 12.

The autoclave 52 includes a heating mechanism 62 and an opening 64 above the vacuum bag 54 for applying pressure to the outer surface of the bag 54. The autoclave pressure is what causes the caul 12 to be drawn into engagement with the support flange 20. Initially, there is a gap 66 between the caul 12 and the lay-up 40. With the application of vacuum and low autoclave pressure, the caul 12 flexes along its length to conform to the configuration of the lay-up 40 with bulk 48 and the gap 66 is eliminated. As autoclave pressure is applied the caul moves downwardly until the edge of the caul meets the support flange 20, shown in FIGS. 13 and 14.

The component is autoclave cured in a sequence that involves heating the mold 10 and lay-up 40 to a dwell temperature and pressure where the composite material moves in a controlled manner. This movement continues through the dwell until the caul 12 is restrained by the female flange section 20 of the mold 10, thus limiting further motion. The temperature is then increased and held at an elevated temperature and pressure for sufficient time to completely cure the composite component. The cure cycle will be discussed in greater detail below.

Figure 13:
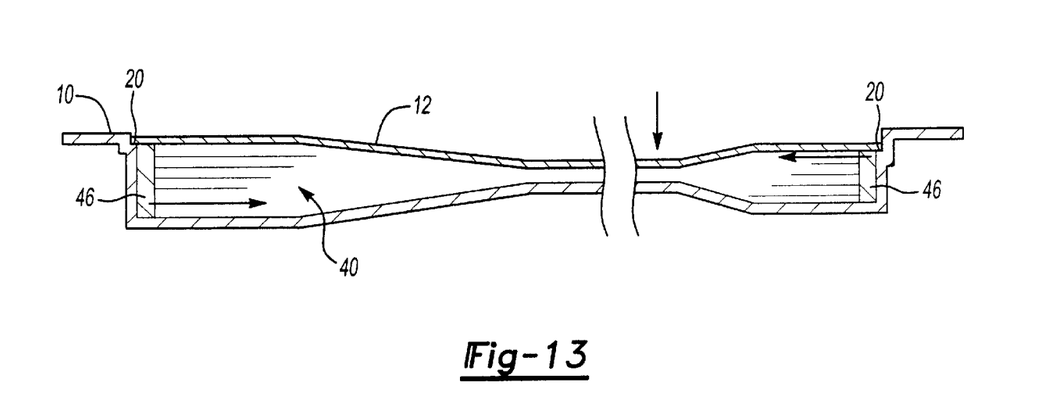
FIG. 13 is a longitudinal cross-sectional view of the mold and caul showing the reduction of bulk during the cure cycle and the engagement of the caul with the support flange formed within the mold cavity.
Figure 14:
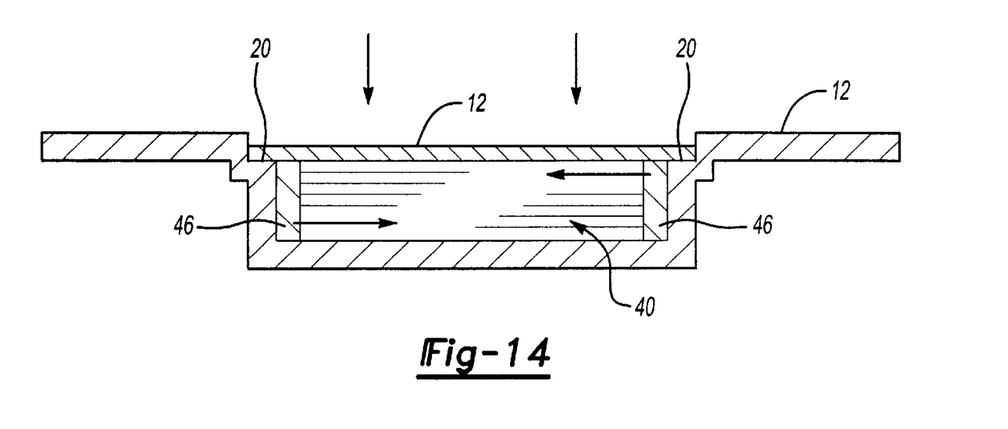
FIG. 14 is similar to FIG. 13 but shows a cross-section view taken along the width of the mold and caul.

During this process, the bulk 48 is removed from the lay-up 40, shown in FIG. 13, as the caul 12 moves to a point where it is restrained by the flange 20 of the mold 10, shown in FIG. 14. The flange 20 runs along the entire length of the mold 10 (FIG. 1) and supports the caul 12 along its entire length on both sides. The caul 12 is designed so that it is very stiff across its width to resist deflecting force once it is supported by the flanges 20.

The heating process is followed by a cool down and purging of the autoclave. The cure cycle and cool down are in accordance with the specific requirements of the composite material being used, the configuration of the composite component, and the thermal properties of the tooling.

It is preferable to use an autoclave that is responsive and can reach higher pressures, i.e. pressures up to 200 psi. A predetermined cure cycle is initiated once the mold 10 and caul 12 a vacuum bagged and placed in the autoclave. The multi-step cure cycle has independent temperature and pressure cycles. This makes sure that complete caul closure occurs at a point before full resin system gellation.

The temperature cycle includes the following steps. The temperature is slowly increased from 80° F. to 250° F. at approximately 1° F. per minute. The temperature is dwelled at 205° F. for approximately 4 hours. This makes sure the autoclave has sufficient time to close the caul in contact with the female mold section and the resin system is sufficiently gelled. The dwell also prevents an uncontrolled exothermic reaction as temperature increases for the final cure. The temperature is then slowly increased from 205° F. to 365° F. at approximately 1° F. per minute. The temperature is dwelled at 365° F. for a 2 hour minimum for full part cure. Finally the temperature is slowly decreased from 365° F. to 150° F. at approximately 2° F. per minute to minimize the effect of thermal strain on the laminate as the part cools.

The pressure cycle includes the following steps. Full vacuum is applied to the lay-up. The pressure is slowly increased up to 100 to 200 psi at a rate that causes the caul to fully close with the female mold at less than 200 psi. As the pressure reaches approximately 20 psi start venting the vacuum at a rate equivalent to the pressure increase. The pressure is held at 100 to 200 psi until the autoclave cools to 150° F. then full vacuum is applied and pressure is vented. When the component temperature cools below 150° F. the autoclave is purged. The component is then removed and inspected as is known in the art.

Figure 15:
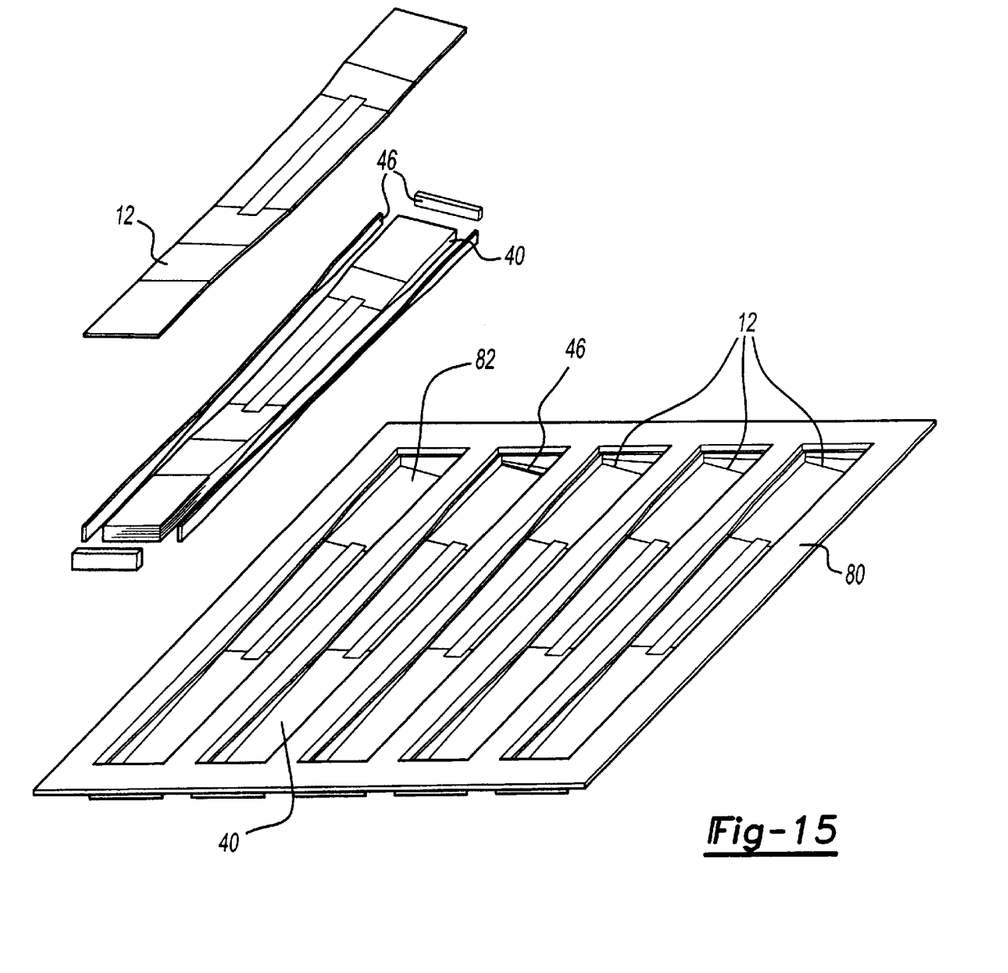
FIG. 15 is a multi-cavity mold.

A mold 10 with a single cavity 18 can be used or a mold 80 with a plurality of cavities 82 can be used, shown in FIG. 15. Such a mold 80 would use separate cauls 12 for each cavity so that individual lay-up variations can be accommodated. Thus, multiple components could be formed at a single time. As shown in FIG. 15, the first cavity 82 is an empty cavity, the next cavity includes the lay-up 40 and the foam members 46, and the final three (3) cavities have cauls 12 resting on top of the lay-up 40 and are ready for vacuum bagging.

The subject method and apparatus provide several unique features. The method offers dimensional control advantages of press curing and matched tooling and the process advantages of autoclave curing. Complex prepreg composite components can be autoclave cured with predictable and repeatable dimensional control of critical surfaces and related features. Composite components with very high variations in thickness (0.3 to 2.5 inches) can be made from this process. Per ply thickness variations in prepreg composite materials can also be accommodated. This method is capable of accommodating raw material volume variations up to 5% and with the addition of simple in-process controls can accommodate volume variations up to 17%. Another advantage is that cured part scrap can be reduced because the method compensates for variations in raw material per ply thickness. Also, the method does not change the fiber volume from that of the prepreg raw material.

Other unique features include the capability to control displacement of the composite material. The direction in which the composite material flows is controlled by the location of the deformable foam material.

This unique method and apparatus can be used in a variety of different applications in addition to those applications discussed above. The autoclave curing can be used for composite components that require thickness control in combination with the ability to machine or trim the component in at least one direction. The autoclave curing can also be used for composite components with build-ups or pad-ups requiring thickness control. This process can also be used for hydroclave and thermex® cured composite components.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for controlling thickness during fabrication of an autoclave cured component comprising the steps of:
   (a) laying up a plurality of prepreg plies into a female mold defining a cavity including a stop: forming the cavity with a bottom surface, a plurality of walls extending upwardly from the bottom surface, and an open upper face surrounded by a mold edge; and forming the stop as a support flange extending toward the center of the cavity from each of the walls at a predetermined distance upward from the bottom surface;
   (b) installing a caul over the lay-up; and
   (c) curing the lay-up in an autoclave to cause the caul to be restrained by the stop.

2. The method of claim 1 and including the step of inserting removable spacers against the walls prior to step (a).

3. The method of claim 2 including the steps of transferring the lay-up into a cure mold and removing the spacers prior to step (b).

4. The method of claim 3 including the step of inserting a plurality of deformable members between said walls and said lay-up prior to step (b).

5. The method of claim 1 including the steps of performing periodic cold vacuum compaction cycles combined with at least one autoclave compaction cycle prior to step (b).

6. The method of claim 1 including the step of inserting interchangeable rails within the cavity prior to step (a).

7. The method of claim 6 including the step of removing the interchangeable rails after the lay-up has been placed within the cavity and filling the space between the lay-up and cavity walls with a sacrificial material.

8. The method of claim 1 including the steps of vacuum bagging the mold, lay-up, and caul and checking for leaks.

9. The method of claim 8 including the steps of heating the mold and the lay-up to a dwell temperature and pressure until the caul is restrained against the stop.

10. The method of claim 9 including the step of increasing and holding the temperature and pressure for a predetermined amount of time to cure the component.

11. The method of claim 1 including the step of forming the caul from an anisotropic material having greater flexibility about a first axis than a second axis that is transverse to the first axis.

12. The method of claim 1 including the step of forming the anisotropic material from a rigid fiber composite including a plurality of fiberglass laminates sandwiched between a plurality of graphite laminates such that the caul is rigid about the lateral axis and flexible about the longitudinal axis.

13. The method of claim 1 including the step of varying the predetermined distance along the length of the mold within a range of 0.3 inches to 2.5 inches.

14. A method for controlling thickness during fabrication of an autoclave cured component comprising the steps of:
  (a) laying up a plurality of prepreg plies into a female mold defining a cavity including a support flange extending into the cavity;
  (b) installing a caul over the prepreg plies;
  (c) applying pressure against the caul during an autoclave curing process to move the caul towards the support flange; and
  (d) curing the lay-up to restrain movement of the caul with the support flange.

15. The method of claim 14 including the step of forming the cavity with a bottom surface, a plurality of walls extending upwardly from the bottom surface, and an open upper face surrounded by a mold edge with the support flange extending into the cavity from at least one of the walls.

16. The method of claim 15 including the step of positioning the support flange at a predetermined distance downward from the mold edge.

17. The method of claim 16 the step of varying the predetermined distance along the mold edge.

18. The method of claim 15 including the step of extending the support flange into the cavity from a plurality of the walls.

19. The method of claim 15 including the step of forming the support flange generally perpendicular to the wall.

20. The method of claim 14 including the step of receiving the caul at least partially within the cavity during step (c).

21. The method of claim 14 including the step of drawing the caul into engagement with the support flange.

* * * * *

UNITED STATES PATENT AND TRADEMARK OFFICE
CERTIFICATE OF CORRECTION

PATENT NO.    : 6,696,009 B2
DATED         : February 24, 2004
INVENTOR(S)   : Davis It is certified that error appears in the above-identified patent and that said Letters Patent is hereby corrected as shown below:

<u>Column 8,</u>
Line 54, ":" should be -- ; --.

<u>Column 9,</u>
Line 28, "claim 1" should read as -- claim 11 --.

<u>Column 10,</u>
Line 22, please insert -- including -- before "the" and after "claim 16".

Signed and Sealed this

Twenty-seventh Day of April, 2004

JON W. DUDAS
*Acting Director of the United States Patent and Trademark Office*